(12) United States Patent
Becherer et al.

(10) Patent No.: US 11,070,699 B1
(45) Date of Patent: Jul. 20, 2021

(54) SYSTEMS AND METHODS FOR FACILITATING DETERMINING CONTEXTUAL AND SEMANTIC MEANING FROM AN IMAGE SCAN

(71) Applicants: Steven Michael Becherer, Creve Coeur, MO (US); Matthew Bryan Weatherford, Austin, TX (US); Jason Eric Robke, St. Louis, MO (US)

(72) Inventors: Steven Michael Becherer, Creve Coeur, MO (US); Matthew Bryan Weatherford, Austin, TX (US); Jason Eric Robke, St. Louis, MO (US)

( * ) Notice: Subject to any disclaimer, the term of this patent is extended or adjusted under 35 U.S.C. 154(b) by 0 days.

(21) Appl. No.: 16/810,418

(22) Filed: Mar. 5, 2020

(51) Int. Cl.
*H04N 1/32* (2006.01)
*H04N 1/00* (2006.01)

(52) U.S. Cl.
CPC ..... *H04N 1/32128* (2013.01); *H04N 1/00127* (2013.01); *H04N 2201/3225* (2013.01); *H04N 2201/3274* (2013.01)

(58) Field of Classification Search
None
See application file for complete search history.

(56) References Cited

U.S. PATENT DOCUMENTS

| 5,040,214 | A | 8/1991 | Grossberg et al. |
| 5,875,108 | A | 2/1999 | Hoffberg et al. |
| 7,606,425 | B2 | 10/2009 | Bazakos et al. |
| 2008/0002892 | A1 | 1/2008 | Jelonek et al. |
| 2009/0028434 | A1 | 1/2009 | Vanhoucke et al. |
| 2011/0258682 | A1* | 10/2011 | Yin .......... H04L 63/12 726/3 |
| 2015/0310301 | A1 | 10/2015 | Zadeh |

* cited by examiner

*Primary Examiner* — Lennin R RodriguezGonzalez

(57) ABSTRACT

Disclosed herein is a system for facilitating determining contextual and semantic meaning from an image scan. The system may include a communication device configured for receiving a plurality of images from at least one source device, receiving an image scan from at least one user device and transmitting an interpretability notification to the at least one user device. Further, the system may include a processing device configured for analyzing the plurality of images, identifying an image metadata based on the analyzing, analyzing the image scan, identifying an image scan metadata based on the analyzing of the image scan, comparing the image scan metadata and the image metadata, determining an interpretability of the image scan based on the comparing, and generating the interpretability notification based on the determining.

20 Claims, 11 Drawing Sheets

SYSTEMS AND METHODS FOR FACILITATING DETERMINING CONTEXTUAL AND SEMANTIC MEANING FROM AN IMAGE SCAN

FIELD OF THE INVENTION

Generally, the present disclosure relates to the field of optical character recognition. More specifically, the present disclosure relates to methods and systems to facilitate determining the contextual and semantic meaning from an image scan.

BACKGROUND OF THE INVENTION

An Optical Character Recognition (OCR) may be a software methodology to translate image scans (IS) into readable text. The OCR translates various texts into digital documents. Further, the OCR, in an instance, may consist of two components: (1) a hardware component for creating an IS, and (2) a software that may take the IS as an input data and may output a digital document. Historically, the hardware component has been a specialized tool for gathering the input data. By using custom hardware specifications, it may be much easier to determine the delineations belonging to an IS. However, recent trends toward mobile application development, in an instance, may have placed more emphasis on using a mobile phone's camera as the hardware component as the input to the OCR. Consequently, myriad technical obstacles have surfaced that may make parsing the input data more difficult than it has been historically with custom devices. Secondarily, mobile devices may lack in processing power, mobile and/or Wi-Fi connection, and may have varying levels of pixelation in images.

Further, the changes in medium and medium quality, in an instance, may have questioned a validity of a holistic approach to interpreting images from non-deterministic processes and tools. Further, any deterministic solution, in an instance, may seem overly simplistic when the input data is entirely stochastic. Further, modern methods still insist on making assumptions about input variables that may directly affect both the ability of the OCR to translate and the resources used by the mobile application.

Therefore, there is a need for improved methods and systems to facilitate determining the contextual and semantic meaning from an image that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a system for facilitating determining contextual and semantic meaning from an image scan. The system may include a communication device configured for receiving a plurality of images from at least one source device. Further, the communication device may be configured for receiving an image scan from at least one user device. Further, the communication device may be configured for transmitting an interpretability notification to the at least one user device. Further, the system may include a processing device configured for analyzing the plurality of images. Further, the processing device may be configured for identifying an image metadata based on the analyzing. Further, the processing device may be configured for analyzing the image scan. Further, the processing device may be configured for identifying an image scan metadata based on the analyzing of the image scan. Further, the processing device may be configured for comparing the image scan metadata and the image metadata. Further, the processing device may be configured for determining an interpretability of the image scan based on the comparing. Further, the processing device may be configured for generating the interpretability notification based on the determining.

According to some embodiments, a method for facilitating determining contextual and semantic meaning from an image scan is disclosed. The method may include receiving, using a communication device, a plurality of images from at least one source device. Further, the method may include analyzing, using a processing device, the plurality of images. Further, the method may include identifying, using the processing device, an image metadata based on the analyzing. Further, the method may include receiving, using the communication device, an image scan from at least one user device. Further, the method may include analyzing, using the processing device, the image scan. Further, the method may include identifying, using the processing device, an image scan metadata based on the analyzing of the image scan. Further, the method may include comparing, using the processing device, the image scan metadata and the image metadata. Further, the method may include determining, using the processing device, an interpretability of the image scan based on the comparing. Further, the method may include generating, using the processing device, the interpretability notification based on the determining Further, the method may include transmitting, using the communication device, an interpretability notification to the at least one user device.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
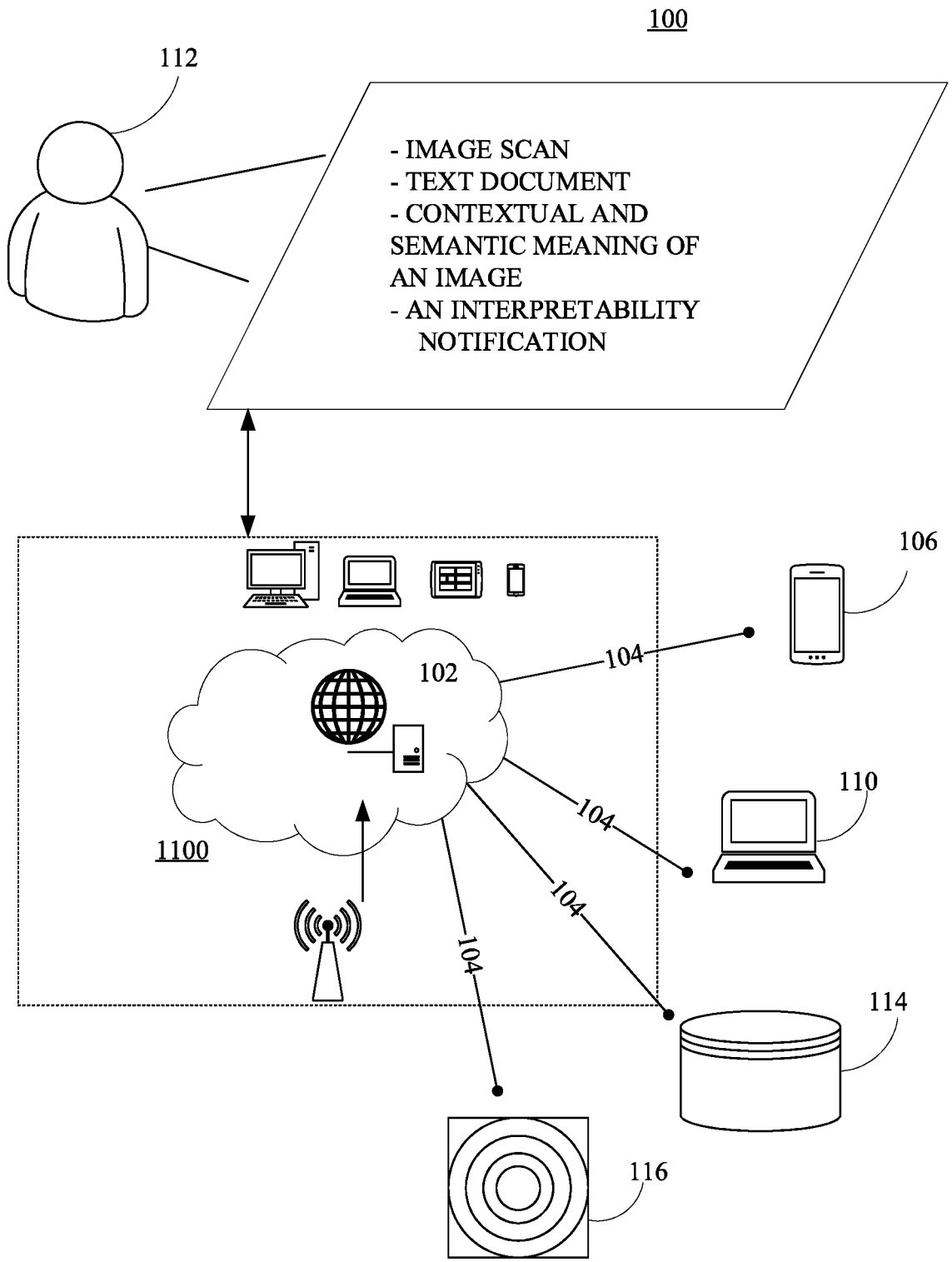
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of systems and methods for facilitating determining contextual and semantic meaning from an image scan, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, and at least one sensor. Examples of the one or more client devices and/or the server computer may include, a desktop computer, a laptop computer, a tablet, a personal digital assistant, a portable electronic device, a wearable computer, a smartphone, an Internet of Things (IoT) device, a smart electrical appliance, a video game console, a rack server, a supercomputer, a mainframe computer, mini-computer, microcomputer, a storage server, an application server (e.g. a mail server, a web server, a real-time communication server, an FTP server, a virtual server, a proxy server, a DNS server, etc.), and so on. Further, one or more client devices and/or the server computer may be configured for executing a software application such as, for example, but not limited to, an operating system (e.g. Windows, macOS, Unix, Linux, Android, etc.) in order to provide a user interface (e.g., GUI, touch-screen based interface, voice-based interface, gesture-based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, a public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled and/or terminated based on a control input received from one or more devices operated by one or more users such as, for example, but not limited to, an end-user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human-readable secret data (e.g. username, password, passphrase, PIN, secret question, secret answer, etc.) and/or possession of a machine-readable secret data (e.g. encryption key, decryption key, bar codes, etc.) and/or possession of one or more embodied characteristics unique to the user (e.g., biometric variables such as but not limited to, fingerprint, palm-print, voice characteristics, behavioral characteristics, facial features, iris pattern, heart rate variability, evoked potentials, brain waves, and so on) and/or possession of a unique device (e.g., a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g., transmitting and/or receiving) with one or more sensor devices and/or one or more actuators in order to perform authentication. For example, the one or more steps may include receiving, using the communication device, the secret human-readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between the performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data there between corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The uniqueness (or non-obviousness) of the present disclosure may come from an interchange between two separate processes, a dynamic creation of endpoints and resources for interpretation, and an ability to nest classifications within others.

Further, the present disclosure posits the ability to both dynamically create classifications and to nest data more accurately represents real-world concerns for which data storage, look-up, and image translation occur.

Further, the present disclosure, in an instance, may consist of two distinct but intertwined routines that may interact in order to determine contextual and semantic meaning within an image scan (IS). A first routine, in an instance, may compare an image's metadata to two things: (1) whether context and semantic meaning were successfully gleaned from the IS, and (2) a quantification of the accuracy. Further, a second routine, in an instance, may translate a text and/or object within an image by using a process that may focus on optimizing for convex normalization or a flattening of the IS before translating the text through an Optical Character Recognition (OCR) and assigning the result to a cluster of similar IS's. The first routine, in an instance, may optimize a medium for translation while the second may employ observations from the first to better apply normalization, translation, and partitioning to an IS. A contextual cluster, in an instance, may be able to provide a probabilistic argument for the existence of objects and the spelling, syntax, and linguistic constructs of the text in the IS. The result, in an instance, may improve a reliability and accuracy of the OCR by categorizing and/or translating the IS within the contextual cluster.

Further, the present disclosure generally relates to an optical character recognition (OCR) system and method of use. More particularly, the present disclosure may be directed to character recognition performed on various electronic devices equipped with a camera, wherein the present disclosure may utilize multiple images interactively captured with the user's guidance to efficiently recognize text having increased accuracy.

Further, the Optical Character Recognition (OCR), in an instance, may be a software methodology to translate image scans (IS) into readable text. The OCR, in an instance, may provide a more efficient means of translating various text based systems into digital documents. Further, by leveraging the commonalities that transcend a written character, the OCR may be able to save time, save cost, and avoid errors common to a human interpreter.

Further, the OCR, in an instance, may consist of two components: (1) a hardware component for creating an IS, and (2) a software that may take the IS as an input data and may output a digital document. Historically, the hardware component has been a specialized tool for gathering the input data. By using custom hardware specifications, it may be much easier to determine the delineations belonging to an IS. However, recent trends toward mobile application development, in an instance, may have placed more emphasis on using a mobile phone's camera as the hardware component within the OCR. Consequently, myriad technical obstacles have surfaced that may make parsing the input data to be more difficult than it has been historically with custom devices. Secondarily, mobile devices may lack in processing power, mobile and/or Wi-Fi connection, and may have varying levels of pixilation in images.

Further, the changes in medium and medium quality, in an instance, may have questioned a validity of a holistic approach to interpreting images from non-deterministic processes and tools. Further, any deterministic solution, in an instance, may seem overly simplistic when the input data is entirely stochastic. Further, modern methods still insist on making assumptions about input variables that may directly affect both the ability of the OCR to translate and the resources used by the mobile application. A newer approach may be needed, an approach in which a variance of input data may not be simplified to such an extent as to make interpretation impossible and in which network resources may be valued for both user experience and software efficiency.

Further, the present disclosure, in an instance, may be a process that may classify myriad images by interpreting the images in order to predict semantics and errors in phrases and words with ever-improving convex optimization. Further, applying rigorous experimentation methods to determine the bounds of internal variables with a convex optimization, strives to make the present disclosure more accurate and/or more responsive to the input data. Further, the convex optimization, in an instance, may be referred to a process of transposing a scan with coordinates x, y, and z and moving them to a, b, and c such that a, b, and c lead to a better interpretation of the scan's text. The convex optimization, in an instance, may allow us to take into account a tilt, a point of view, and dimensionality of a camera and its results.

Further, a purpose of the present disclosure, in an instance, may be to ascertain a logical relation between placement of text and its meaning within a scan. This relation may have the following properties. First, the placement of text on a scan may not be random, second, a particular text in a particular location may be a context of its meaning (and conversely, if any part of a text has little or no relation to its placement, it is inherently less meaningful). Further, given a particular location in a particular text, the present disclosure may have enough context to determine meaning if the context and the text may be related in some way. Further, the scan, in an instance, may be a digital representation of an external object. Further, the meaningful, in an instance, may mean nothing other than a process through which the present disclosure may classify a word or a phrase as belonging to a subset of a class. For example, if the present disclosure may come across an address, it may only be meaningful if the present disclosure may interpret the address as an address, and/or may correctly read the characters in the address. Further, the present disclosure may mitigate human error in determining the bounds of variables relating to scanning by parsing the data, understanding the external properties which may lead to the interpretation of this data, and/or applying Machine learning (Support Vector Machine analysis) on the set to determine a set of properties that may indicate an image may be adequately translated or not. In short, the present disclosure, in an instance, may use machine learning to determine an answer to several questions (such as 1. does an image fit within the bounds of a scan that can be interpreted, 2. do the non-text based properties lead us to know anything about the content of the text, and 3. can the properties of the scan be a continuance or start of a pattern whereby we can classify future images as close enough to warrant a "fast lane" to interpretation and parsing.).

Further, the present disclosure, in an instance, may use two separate but complementary processes to determine the contextual and semantic meaning within an image. A first process may not merely be preprocessing, but also interpretation. Further, the first process, in an instance, may use a metadata gleaned from an image to answer two questions: (1) Does an image pass a threshold for interpretation, and (2) do the immediate descriptors of the image (i.e. those properties derived from a raw image) give any credence to an assumed categorization? Further, the assumed categorization, in an instance, may occur in two ways: (a) Either through explicit categorization, in which an application or a user limits the interpretation to an object, and a parent process consequently limits its introspection to determine the image's legibility, or (b) through a bulk categorization that may use Support Vector Machines or a Random Forest Classifier to create a set of categories that may act as a baseline for further processing. Further, even if a particular categorization may be achieved through the first way, the present disclosure may still employ a supervised machine learning algorithm for validation. Further, the two sub-processes belonging to the first larger process, in an instance, may also be intrinsically intertwined. Further, particular categories, in an instance, may merit particular strategies for both structuring and/or be interpreting the image's descriptors. Further, an essential part of the interpretation, in an instance, may be contour detection and normalization (which occurs in the second main process). Further, underlying contour detection may include an assumption that an image of a particular type may not only be similar through an apprehension of the object but also through its "apprehending" by the user. Context, therefore, belongs not only to the image's metadata but also to its categories commonly found variations.

Further, as stated above, the second process, in an instance, may begin with convex normalization that may include a flattening of an image (zoom to a textual content of the image). Further, the second process may include transforming the image into grayscale for better detection. Further, the flattening of the image may not be distinct from the categorization. What follows is a translation by an OCR, which may be bolstered by a language specific dictionary of words, phrases, and names belonging to the images categorization.

Further, using the term dictionary may also be wrong on two counts. In its more colloquial use, a dictionary may not define a context. Further, context detection for the present disclosure, in an instance, may include checks that may be more specialized, i.e. the structure belongs to a web of connected nodes, each containing information belonging to the categorization. For instance, a node 'pet' would contain 'dog' and 'cat'. Further, a child node may incorporate not only the term itself but also a number representing the term's frequency within a grouping. The number, in an instance, may be nothing other than the frequency of the use of each child node relative to all the other nodes within the same grouping. Further, the present disclosure, in an instance, may use the number to determine context when a node may appear as a result of two nodes. For instance, 'dog' may appear more frequently under the node 'pet' than under the node 'house'. A higher use may be favored over a term that is less used in context.

Further, how does the node's depth play into determining how to choose between the parents of two nodes, which in content may otherwise be equal? The rarity of this question should not determine the effort to answer it. In the above example, we would expect the node 'dog' to appear as both the child of 'house' (as in dog house) and in 'pet' (as in I got a dog for Christmas). Further, a user may also expect that 'dog' will be more frequently the child node of the node 'pet' than of the node 'house'. If a rule for determining context were "Always choose the most frequent usage," the user may miss out on a more defined use of the word. In other words, an algorithm would only detect meaning when that meaning may be commonly used. On the other hand, the user may choose a more specialized meaning, our context would reflect only the most specialized of domains. Neither extreme may be attractive. The solution involves a more nuanced approach of finding links between the child nodes.

For example: for a text 'My dog needs a roof'. The meaning of the text may include 'My dog house needs a roof'. The present disclosure may follow subsequent steps in order to determine a common context between one or more nodes. The present disclosure, in an instance, may isolate all the important words, or more accurately, determine the words most likely to add no meaning (e.g. "a", "the"). Further, the present disclosure, in an instance, may determine a placement of each node within a graph. For instance, if a node has one parent node, note its context. In the example above, 'roof' may very well have only one use, that is as an enclosure to the top of a building. Therefore, the context of the word 'roof' may be building. Further, if a node has multiple parent nodes, iterate through the other found contexts to find out if the meaning is a parent or child node. For instance, 'dog' has two parents, 'house' and 'pet'. Further, (as the context is building) 'building' has the child node, 'house'. The present disclosure, in an instance, may find the context in common and may have an argument on why the user may choose 'house' as the context rather than 'dog'. Further, a summary of the context may become the nodes themselves and their context as dog, house, building, and roof etc.

By now we may realize why the term dictionary may be inaccurate in a more technical sense. The structure of a data, in an instance, may not be flat and may not be specialized for searching. However, a resulting structure is a map of keys and values, optimized for both searching and insertion.

Further, an interpretation, in an instance, may include both analysis and synthesis. In breaking apart terms to their parent nodes, we may analyze the terms, but through synthesis, we may translate a map of key-value pairs into a structural argument for holistic interpretation and parameter re-structuring.

Further, categories, while typically not re-evaluated on a per-image basis, may not be static. Categorization uses a fractal-like branching strategy that may correlate three variables: accuracy, sample size, and/or dictionary size (i.e. a data cohesion and size of the dictionary). Further, by using a branching strategy, the present disclosure may improve upon itself, becoming more accurate as the present disclosure may be able to focus on a sub-category that may be found within the image. Further, speed may also be an issue when using the OCR and machine learning. By branching out categories as proactively as possible (i.e. by keeping a category's sample size as small as possible without sacrificing accuracy), the present disclosure may lookup phrases, categorize, and flatten images more efficiently.

Accordingly, the present disclosure, in an instance, may gather a plurality of images. The plurality of images, in an instance, may be processed by a system through a machine learning algorithm that may essentially classify the data by the placement of labels. For instance, for a company x, we know the doctor's name may be in the top right, then instead of a ton of if-statements, the system may automatically learn for us. Further, the system, in an instance, may analyze images in order to learn the placement of words, phrases, and/or names etc. from the plurality of images. Further, the system, in an instance, may gather a raw data from the plurality of images. The raw data, in an instance, may include specific medical terminology, conditions, or medications for the aforementioned case. Further, this data, in an instance, may be printed on varying surfaces and include different contours. Further, the system, in an instance, may determine the contour of the image, draw boundaries around a written information, and/or run a transformation such that [x, y, z]=[x, y] (3d to 2d). Further, the system, in an instance, may apply an EIG function to transpose a matrix of three dimensions to two, but may apply a constant transform that may include the camera's field of view, focal length, pitch, width, and/or the average curvature of the object in question etc. Further, a resulting matrix (alpha, where alpha=the field of view), in an instance, may be equal to two times the cotangent times the fractional integer I, where I may be an image field dimension divided by two times the focal length. Therefore, by determining the most common focal lengths and the most common field of view, the system may determine the focal length in pixels. For instance, the average field of view (FOV) may be between 50 to 70 degrees. So, given a web-camera with dimensions of 2560×1440, the focal length may be between 2200 and 2600, and a guess of 2400 may be optimal. Further, given that the application may be used on mobile devices, it may also be advantageous to determine the diagonal field of view as per a supervised learning model and an untrained dataset. Therefore, given that w2+h2=d2 the system, in an instance, may determine both HOV and FOV from the diagonal point of view. Further, a result, in an instance, may be a focused, framed, and/or flat scan that may be optimized for the supervised learning model.

Further, the system, in an instance, may run each image through the OCR. For each image, the system may create a key/value store that may include a class based node with two fields. The first field, in an instance, may be a text taken from the OCR while the second, in an instance, may be a value that may be inputted from a supervised agent.

Further, by default, the supervised value of an image's OCR node need not be applied until after its recognition by the OCR software. This may be important because images that may score below a certain threshold do not need to be supervised. Further, the images (that may score above a certain value) may be reviewed by a supervised agent that may insert the interpretation of the text within the scan as a value for the corresponding node. Using a simple algorithm to check the number of differences in a string, the system may determine its accuracy relative to its length. Optionally, this accuracy may also be a part of the node.

As an example, the node (in programming terms) may be seen as:
class Node {
constructor(id, data, ocrTranslation, supervisedTranslation, accuracy) {this.id=id;
this.ocrTranslation=ocrTranslation;
this.supervisedTranslation=supervisedTranslation;
this.accuracy=accuracy;
}
}

Further, for each node, the system, in an instance, may compare a supervised learning translation to the OCR translation and may create an accuracy field. The accuracy field, in an instance, may be nothing other than a number of characters in the interpretation of the scan that may be correctly categorized over the total number of characters within the scan. Further, the accuracy field, in an instance, may be used to validate the correctness of the OCR in reading a scan. For each iteration of translation where an image may be translated, the accuracy field of interpreting that image must be reassessed. The accuracy field, in an instance, may be the result of a pure function, where given the same image and the same text the system may always return the same result. Further, the system, in an instance, may average the accuracy field of every single node, to get a good idea of the total accuracy of the system.

Further, the system, in an instance, may fine tune the parameters as the number of images (n) increases such that the accuracy (a) is proportional to n. Although a procedure to determine a meaning of the text may be mathematical, there may be no guarantee that if parameters belonging to a set (x) may remain unchanged with a variance in the number of images. So although the general structure of the equation may remain the same, the variables within that equation may change relative to the number of input images. Further, as the number of the images increase, any assumption about the accuracy of any parameter or any grouping of parameters, may not be validated. For each iteration, the parameters may be reassessed. Eventually, a pattern may emerge such that as the accuracy (a) reaches 100 percent, parameter 'p' reaches a discrete value 'D'. Further, any parameter (P) may not be a constant when relative to the number of images (I). Yet a change of P with regard to the change in I may be a constant. This means that although P may not be directly proportional to I, the rate of change of P may be directly proportional to the rate of change in I. Further, an accuracy of P as a set may be nothing other than the best collection of parameters that may lead to the OCR's accuracy. Further, limiting and/or increasing out datasets may serve two purposes: one, it may allow the system to better understand the extremes that may belong to disparate images, and two, it may allow the system to draw a line in Bayesian fashion between the two extremes to determine the ideal setting of parameters. Further, a fine-tuning of parameters may be intrinsically tied to bettering the algorithm itself. A unique advantage of the system over other systems may include that the system may not only gather more understanding of the type of data but may learn and/or "learns to learn better" through self-reflection.

Further, the system, in an instance, may learn from the plurality of images until an accuracy of greater than an accuracy threshold may be acquired by the system. Once the accuracy threshold has been hit (for example, once the supervised learning model correctly classifies 95% of images), the system may be used on user data.

Further, immutability may often be strived for in the context of mathematically-based structures used in programming. This may keep both fields similar in the sense that they retain functional purity (i.e. given some input 'A' it will always return 13'). But some ambiguity, in an instance, may be observed since the units of any function themselves may be entirely pure while a combination of them in a loose order may not be entirely pure. A simple way to think about this may be in terms of the order of operations. Given the expression (8+2*3^2), there may be an order that the expression's result must adhere to be to correct.

How does this relate to the present disclosure? Assume that there may be varying groups of images coming into a system. If the system were already trained prior to receive an image, then the present disclosure may say that in receiving an image I the system may always return context C and results in R. Unfortunately, this is not the case. The image I may be "translated" on an understanding of a prior image (I-T), where 'T' even if known may have no bearing on the image's direct interpretation. How can we enforce that the images most relevant to the image's interpretation may be translated prior to the image in question? A short answer may be that we have no control over the ordering of images into the system (beyond the initial training data and a simple filter to remove irrelevant information). Further, a method, in an instance, may exist in which the present disclosure may assign categorizations according to a set of rules that best map over the data. This may be a revision of the Random Forest Classifier. As with many such classifiers, it may be possible to over-fit a model such that the model may accurately define an existing data, but only because it happens to have a certain set of characteristics (let X, Y). Further, this brings us back to an essential difference of the present disclosure from any existing method. By using a mix of different supervised and/or unsupervised techniques, the present disclosure may be able to classify an image through multiple lenses. Further, the present disclosure may have the initial classification of the image, which may be sent external to the system and may be verified by the OCR. Further, the present disclosure may have a classification according to the image's metadata (e.g. a method could be, retrieve all unverified classifications under classification C that may have a focal length between X and Y.).

Further, it may important to note the conditions of failure. These can occur from several different causes: (1) hardware or software bugs or cessation of service, (2) an inability to verify that an image belongs to a classification. Condition 1 may be common to all software, but rather than seeing the second issue as a full error, it is important not to discard unverified, but human categorized nodes since it could be classified later when there may be more training data available.

According to some embodiments, a method to facilitate learning an image metadata from a plurality of images, in accordance with some embodiments is disclosed. Accordingly, the method may include a step of receiving, using a communication device, a plurality of images. Further, the method may include a step of analyzing, using a processing device, the plurality of images. Further, the method may include a step of identifying, using the processing device, an image metadata based on the analyzing. Further, the method may include a step of storing, using the processing device, the plurality of images based on the image metadata in a database.

According to some aspects, a method to facilitate determining an interpretability of an image scan using an image metadata, in accordance with some embodiments is disclosed. Accordingly, the method may include a step of receiving, using a communication device, an image scan from a user device. Further, the method may include a step of analyzing, using a processing device, the image scan. Further, the method may include a step of identifying, using the processing device, an image metadata based on the analyzing. Further, the method may include a step of determining, using the processing device, an interpretability of the image scan based on the image metadata.

According to some aspects, a method to facilitate flattening of an image scan based on an interpretability of the image scan before translating through an OCR, in accordance with some embodiments is disclosed. Accordingly, the method may include a step of receiving, using a communication device, an image scan from a user device. Further, the method may include a step of analyzing, using a processing device, the image scan. Further, the method may include a step of identifying, using the processing device, an image metadata based on the analyzing. Further, the method may include a step of determining, using the processing device, an interpretability of the image scan based on the image metadata. Further, the method may include a step of flattening, using the processing device, the image scan based on the interpretability.

According to some aspects, a method to facilitate determining contextual and semantic meaning from an image scan, in accordance with some embodiments is disclosed. Accordingly, the method may include a step of receiving, using a communication device, an image scan from a user device. Further, the method may include a step of analyzing, using a processing device, the image scan. Further, the method may include a step of identifying, using the processing device, an image metadata based on the analyzing. Further, the method may include a step of determining, using the processing device, an interpretability of the image scan based on the image metadata. Further, the method may include a step of performing, using the processing device, a translation of the image scan based on the interpretability.

According to some aspects, a method and system to facilitate determining contextual and semantic meaning of the image by adding more subsets of images in order to increase an accuracy of the present disclosure, in accordance with some embodiments is disclosed.

According to some aspects, the disclosure may allow for any nesting of classifications. Further, the disclosed process may easily determine features because it already assumes a categorization. Further, the classification is more of a verification step than the end goal. Further, the disclosed process is designed for the interpretations of particular images. Further, the disclosed process can take fragments of different properties belonging to the image and create a partial context. Further, the disclosed process dynamically creates new classifications.

Further, the disclosure relates to a supervised learning method as opposed to unsupervised. Further, the disclosed process does not need manual verification once it is fully trained, but it cannot be trained without a manual verification step.

Further, the disclosed process avoids a bifurcation by providing one endpoint per cluster. The bifurcation includes split into two parts: (1) into an endpoint extractor, and (2) a feature extractor. Further, the disclosed process employs machine learning, categorization to achieve a goal of extracting more useful information from an image.

Further, the disclosed process is more effective in narrow niches, where similar images will often be interpreted.

Further, the disclosed system is focused on the interpretation of particular images rather than determining general metadata for image analysis and processing.

Further, the disclosed process focuses not only on the content of an image, but also on the methodology of how the image was taken in the first place. The curvature is only one of these differences and others include "field of view," tilt, and the sharpness of the image.

Further, the disclosed process is focused on extracting meaning from an image, not just from a raw dataset.

Further, the disclosed process strives to not only interpret the data that is there, but also the data which is hidden within the image, such as how the image was taken.

Further, the disclosed process may resolve problems such as—Strict equality operators on nested data structures are prone to inaccuracies because they fail to adequately weigh variables in relation to each other. If we assume for example, that the angle of view is between 40 and 60 degrees, but the actual scan is at 62 degrees, the disclosed process may fail to extract any useful information. Instead of constants between a range of 2 values, we merely feed it a myriad of scans and from these scans, we ascertain the properties of the scan without regard for its content. The constants in a program are behavior and pattern-based instead of mathematical.

Further, the disclosed process may relate to mimicking human reflection. We not only gather more knowledge over time, but wisdom. Further, the disclosed system may be able to not only gather more facts, but understand their implications. Further, the accuracy of the entire model depends upon its use within a larger application. However, it is important that the program keeps a modicum of modularity so that the internal implementation details are kept private while the results are broadcasted to those with the correct authentication credentials. A standard system for doing this is through HTTP Restful services. Images can be classified according to type and accuracy determined through general classification. External services may also employ the API, but the supervised results must also be provided and persisted such that after time the accuracy can better be determined.

By using a real-world example, the model continues to improve inaccuracy. There are essentially three groups of results: those that are incorrectly assigned values, those with partial matches, and those who for the most part are correctly interpreted. In all three instances, the input data allows the algorithm to re-evaluate the parameters (such as image tilt and the frequency of words). The benefit of public-facing API over basic OCR implementations is the fact that it is supervised and it can be fed custom data through image input and through text input. The application of an OCR system is only limited by the breadth of expertise belonging to its use. The system not only scales to accept a large quantity of results, but can also scale to accept large qualitative differences between the subject matter within the scans. If there is not already an existing node with a desired category, one can be created instantaneously and ad hoc. When the accuracy has reached a peak for machine learning, we may spin off nodes of specialized categories which makes the algorithm more efficient, distributed, and safer. Further, the disclosed process may be an application of machine learning in the truest sense of the word. In reducing the external world to seemingly random arrays of 0's and 1's, the machine may be able to transcend the limitations of human vision and see patterns that would be undelectable to the human eye. Computer vision is not human vision, and this is a good thing. Further, the disclosed process tries to take the best from both while also mitigating both of their flaws; it learns not only about the data given to it, but also how to learn better about any data given to it. It is broad enough to be used in virtually any field where the interpretation of a scan is important, and specific enough to get better over time.

FIG. 1 is an illustration of an online platform 100 consistent with various embodiments of the present disclosure. By way of non-limiting example, the online platform 100 to facilitate determining the contextual and semantic meaning from an image may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114, sensors 116, over a communication network 104, such as, but not limited to, the Internet. Further, users of the online platform 100 may include relevant parties such as, but not limited to, end users, and administrators. Accordingly, in some instances, electronic devices operated by the one or more relevant parties may be in communication with the online platform 100.

A user 112, such as the one or more relevant parties, may access the online platform 100 through a web based software application or browser. The web based software application may be embodied as, for example, but not be limited to, a website, a web application, a desktop application, and a mobile application compatible with a computing device 1100.

Figure 2:
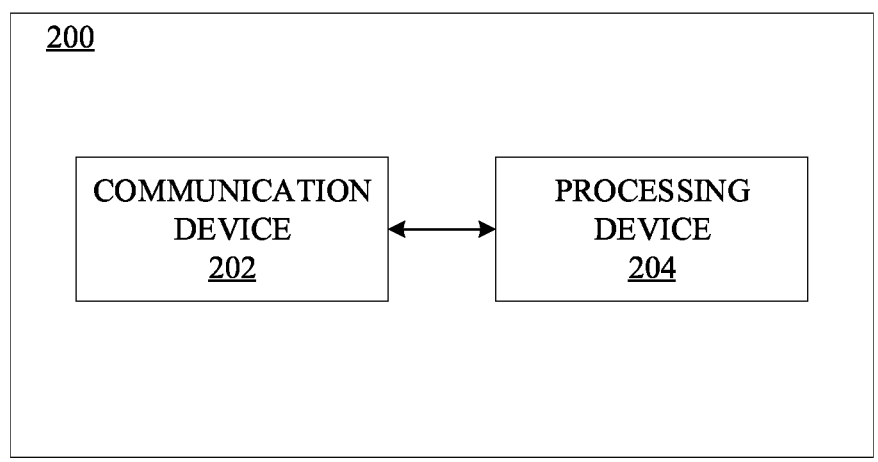
FIG. 2 is a block diagram of a system for facilitating determining contextual and semantic meaning from an image scan, in accordance with some embodiments.

FIG. 2 is a block diagram of a system 200 for facilitating determining contextual and semantic meaning from an image scan, in accordance with some embodiments. Accordingly, the system 200 may include a communication device 202 and a processing device 204.

Further, the communication device 202 may be configured for receiving a plurality of images from at least one source device. Further, the plurality of images may include at least one of a textual content and a non-textual content.

Further, the communication device 202 may be configured for receiving an image scan from at least one user device. Further, the image scan may include at least one of a textual content and a non-textual content.

In some embodiments, the at least one user device may include at least one image sensor. Further, the at least one image sensor may be configured for generating the image scan.

Further, the communication device 202 may be configured for transmitting an interpretability notification to the at least one user device.

Further, the processing device 204 may be configured for analyzing the plurality of images. In some embodiments, the analyzing of the plurality of images may be based on at least one machine learning model. Further, the at least one machine learning model may be configured for determining the image metadata.

Further, the processing device 204 may be configured for identifying an image metadata based on the analyzing.

Further, the processing device 204 may be configured for analyzing the image scan. In some embodiments, the analyzing of the image scan may be based on at least one machine learning model. Further, the at least one machine learning model may be configured for determining the image scan metadata.

Further, the processing device 204 may be configured for identifying an image scan metadata based on the analyzing of the image scan.

Further, the processing device 204 may be configured for comparing the image scan metadata and the image metadata.

Further, the processing device 204 may be configured for determining an interpretability of the image scan based on the comparing.

Further, the processing device 204 may be configured for generating the interpretability notification based on the determining.

In further embodiments, the processing device 204 may be configured for flattening the image scan based on the interpretability. Further, the flattening may include transforming of the image scan from a three dimensional image scan to a two dimensional image scan for determining a contour of the image scan. Further, the flattening may include transforming of the image scan into a grayscale image scan.

In further embodiments, the processing device 204 may be configured for performing translation of the image scan based on the interpretability. Further, the communication device 202 may be further configured for transmitting the translation to the at least one user device. Further, the performing of the translation may use an optical character recognition. Further, the optical character recognition may include a language specific dictionary for recognition of at least one of words, phrases, and names associated with the image scan. Further, the language specific dictionary may include a plurality of nodes. Further, each node of the plurality of nodes may represent at least one of a word, a phrase, and a name and a percentage signifying usage of at least one of the word, the phrase, and the name in the image scan. Further, a node of the plurality of nodes facilitates the translation of the image scan.

In further embodiments, the at least one user device may include a plurality of images and an image scan. Further, the at least one user device may be configured for analyzing the plurality of images. Further, the at least one user device may be configured for identifying an image metadata based on the analyzing. Further, the at least one user device may be configured for analyzing the image scan. Further, the at least one user device may be configured for identifying an image scan metadata based on the analyzing of the image scan. Further, the at least one user device may be configured for comparing the image scan metadata and the image metadata. Further, the at least one user device may be configured for determining an interpretability of the image scan based on the comparing. Further, the at least one user device may be configured for generating an interpretability notification based on the comparing. Further, the at least one user device may be configured for displaying the interpretability notification.

Figure 3:
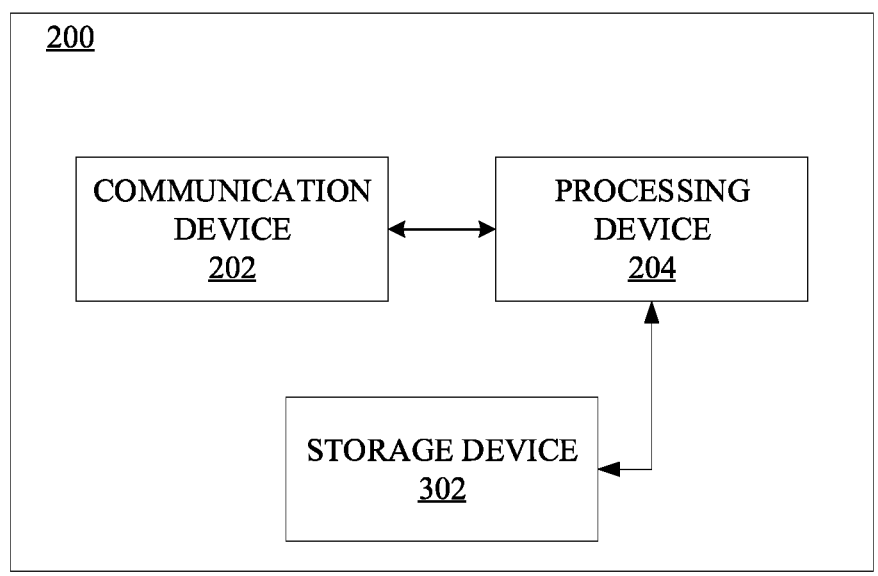
FIG. 3 is a block diagram of the system for facilitating determining contextual and semantic meaning from an image scan, in accordance with further embodiments.

FIG. 3 is a block diagram of the system 200 for facilitating determining contextual and semantic meaning from an image scan, in accordance with further embodiments. The system 200 may include a storage device 302. The storage device 302 may be communicatively coupled with the processing device 204. Further, the storage device 302 may be configured for storing the plurality of images and the image metadata in a database.

Figure 4:
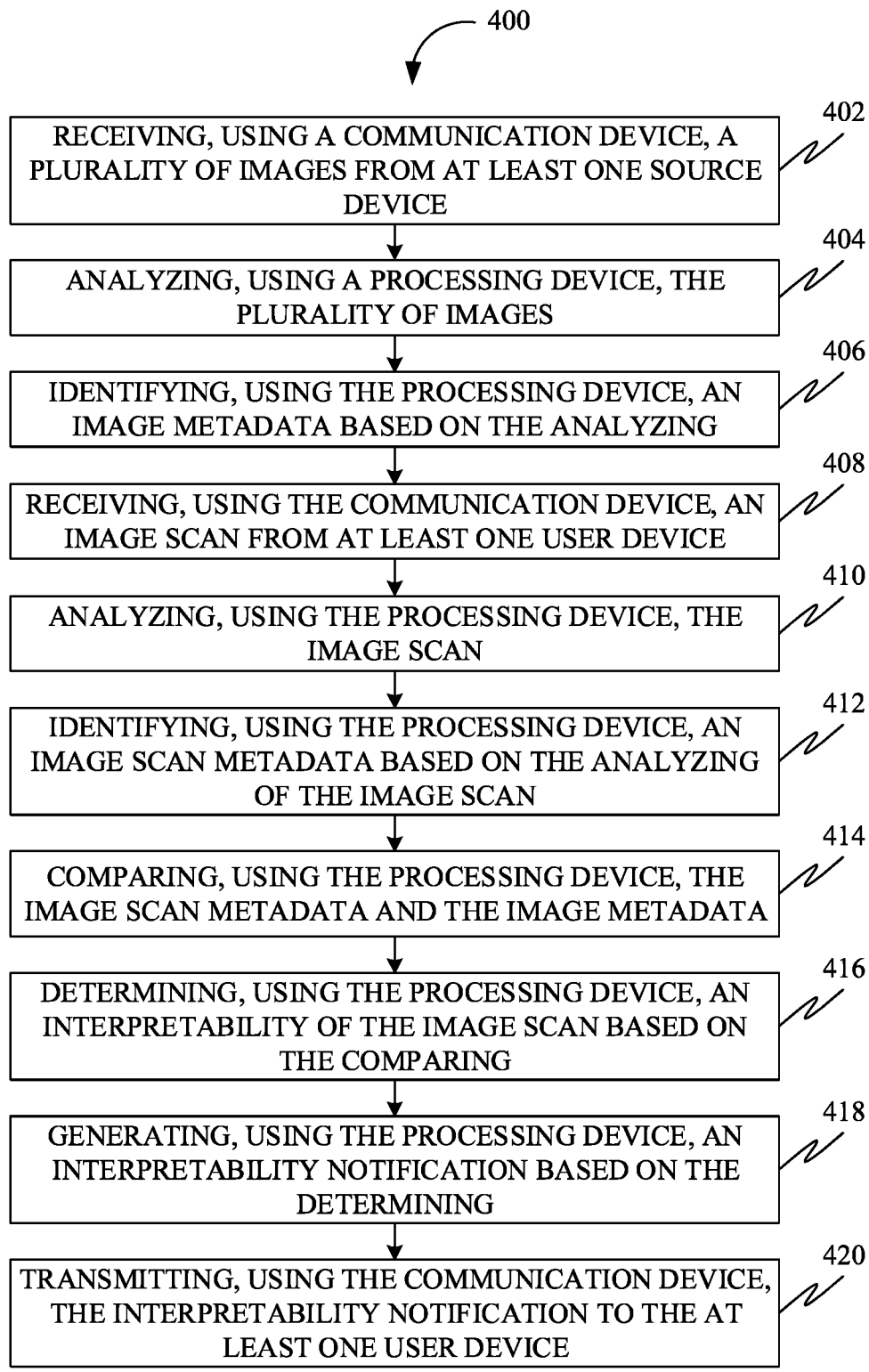
FIG. 4 is a flowchart of a method for facilitating determining contextual and semantic meaning from an image scan, in accordance with some embodiments.

FIG. 4 is a flowchart of a method 400 for facilitating determining contextual and semantic meaning from an image scan, in accordance with some embodiments.

At 402, the method 400 may include receiving, using a communication device (such as the communication device 202), a plurality of images from at least one source device.

Further, at 404, the method 400 may include analyzing, using a processing device (such as the processing device 204), the plurality of images. Further, the plurality of images may include at least one of a textual content and a non-textual content.

In some embodiments, the analyzing of the plurality of images may be based on at least one machine learning model. Further, the at least one machine learning model may be configured for determining the image metadata.

Further, at 406, the method 400 may include identifying, using the processing device, an image metadata based on the analyzing.

Further, at 408, the method 400 may include receiving, using the communication device, an image scan from at least one user device. Further, the image scan may include at least one of a textual content and a non-textual content. Further, the at least one user device may include at least one image sensor, wherein the at least one image sensor is configured for generating the image scan.

Further, at 410, the method 400 may include analyzing, using the processing device, the image scan.

In some embodiments, the analyzing of the image scan may be based on at least one machine learning model. Further, the at least one machine learning model may be configured for determining the image scan metadata.

Further, at 412, the method 400 may include identifying, using the processing device, an image scan metadata based on the analyzing of the image scan.

Further, at 414, the method 400 may include comparing, using the processing device, the image scan metadata and the image metadata.

Further, at 416, the method 400 may include determining, using the processing device, an interpretability of the image scan based on the comparing.

Further, at 418, the method 400 may include generating, using the processing device, an interpretability notification based on the determining.

Further, at 420, the method 400 may include transmitting, using the communication device, the interpretability notification to the at least one user device.

Further, the method 400 may include flattening the image scan, using the processing device, based on the interpretability. Further, the flattening may include transforming of the image scan from a three dimensional image scan to a two dimensional image scan for determining a contour of the image scan. Further, the flattening may include transforming of the image scan into a grayscale image scan.

Further, the method 400 may include performing translation of the image scan, using the processing device, based on the interpretability. Further, the method 400 may include is further configured for transmitting the translation, the communication device, to the at least one user device. Further, the performing of the translation may use an optical character recognition. Further, the optical character recognition comprises a language specific dictionary for recognition of at least one of words, phrases, and names associated with the image scan. Further, the language specific dictionary may include a plurality of nodes. Further, each node of the plurality of nodes may represent at least one of a word, a phrase, and a name and a percentage signifying usage of at least one of the word, the phrase, and the name in the image scan. Further, a node of the plurality of nodes facilitates the translation of the image scan.

Further, the method 400 may include storing the plurality of images and the image metadata, using a storage device, in a database.

Figure 5:
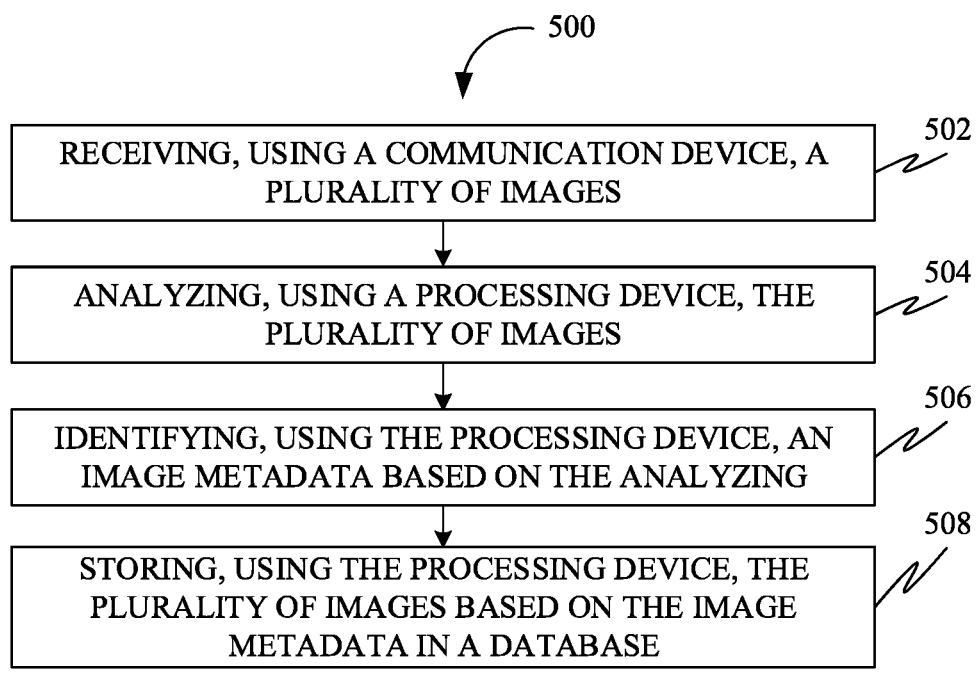
FIG. 5 shows a flowchart of a method to facilitate learning an image metadata from a plurality of images, in accordance with some embodiments.

FIG. 5 illustrates a flowchart of a method 500 to facilitate learning an image metadata from a plurality of images, in accordance with some embodiments. At 502, the method 500 may include a step of receiving, using a communication device, a plurality of images. The plurality of images, in an instance, may be images in a digital form that may comprise of textual and/or non-textual content. The plurality of images, in an instance, may include images of a visiting card, a score card, a memorandum, a note, a handwritten note, a newspaper, a magazine, a report, and/or any arbitrary image that may or may not contain textual content. Each image of the plurality of images, in an instance, may include a characteristic (such as, but not limited to, size, color, type, resolution, pixel density etc.) associated with the image. The characteristics associated with the image, in an instance, may or may not be unique for the image captured from one or more user devices. The one or more user devices, in an instance, may be any image capturing device configured to capture the plurality of images from one or more camera sensors. Further, the user device, in an instance, may include, but not limited to, a smartphone, a laptop, a DSLR, a smartwatch etc. Further, the plurality of images with the same content (textual and/or non-textual), in an instance, may have different characteristics depending upon the one or more user devices used for capturing the plurality of images. For instance, an image captured by a user device such as a DSLR may have different characteristics (such as resolution) for the same image when captured from a different user device such as a smartphone. Further, the plurality of images, in an instance, may have different characteristics when captured from the same user device but with a different surrounding environment and/or time. For instance, an image of a visiting card captured from a user device (such as a smartphone) may have different characteristic (such as distortion) associated with the image when captured at a different surrounding environment and/or time (such as at day time and/or at night time).

Further, at 504, the method 500 may include a step of analyzing, using a processing device, the plurality of images. Accordingly, the analyzing of the plurality of images, in an instance, may be performed by the online platform 100 based on machine learning and/or AI technology. Further, the plurality of images, in an instance, may be analyzed by the online platform 100 with statistical techniques to enable the online platform to learn, without being explicitly programmed. Further, the online platform 100, in an instance, may learn a placement of words, phrases, and/or names etc. from the plurality of images received from the one or more user devices. For instance, an image of a visiting card from a company may have a predefined format (such as a name of a person may be on top right of the visiting card with contact details on bottom left etc.) that may be analyzed and/or learnt by the online platform 100 based on machine learning and/or AI technology.

Further, at 506, the method 500 may include a step of identifying, using the processing device, an image metadata based on the analyzing. Accordingly, the image metadata, in an instance, may be any data associated with an image that may provide insights with regard to the characteristics associated with the image. The characteristics associated with the image, in an instance, may include, but not limited to, size, color, contour, type, resolution, and/or pixel density etc. associated with the image scan. For instance, an image of a visiting card may have an image metadata representing a dimension of the image as 3.5×2 inches. Further, the image metadata, in some embodiments, may include a characteristic of the user device that may be used to capture the image. The characteristic of the user device, in an instance, may include, but not limited to, a field of view, a focal length, a pitch, a width, a curvature, an aperture, a pixel density etc. associated with the user device. For instance, the image metadata for an image captured from a user device (such as a smartphone) may include a field of view of 60 degrees with an aperture of 2 mm.

Further, at 508, the method 500 may include a step of storing, using the processing device, the plurality of images based on the image metadata in a database. Accordingly, the database, in an instance, may be an organized storage space that may be accessed electronically through a wired and/or a wireless communication medium. The database, in some embodiments, may store the plurality of images based on the image metadata associated with each image of the plurality of images in an organized form that may be accessed electronically by the online platform. Further, the image metadata stored in the database, in some embodiments, may be used by the online platform as a reference in order to determine an interpretability of an image scan (IS) by comparing the image metadata of the image scan (IS) with the image metadata stored in the database. The image scan (IS), in an instance, may be an image in a digital form that may be given to the online platform for translating through an optical character recognition (OCR). Further, the interpretability of the image scan, in an instance, may be defined as a property of an image scan to be interpreted and/or understood by the online platform before translating the image scan through the OCR. The interpretability of the image scan, in an instance, may depend upon the image metadata of the image scan. For instance, an image scan may be interpreted by the online platform if an image metadata (such as a field of view of 60 degrees) of the image scan may be a subset of the image metadata stored in the database. Further, the database, in some embodiments, may be configured to categorize and/or store the image metadata based on support vector machine technology.

Figure 6:
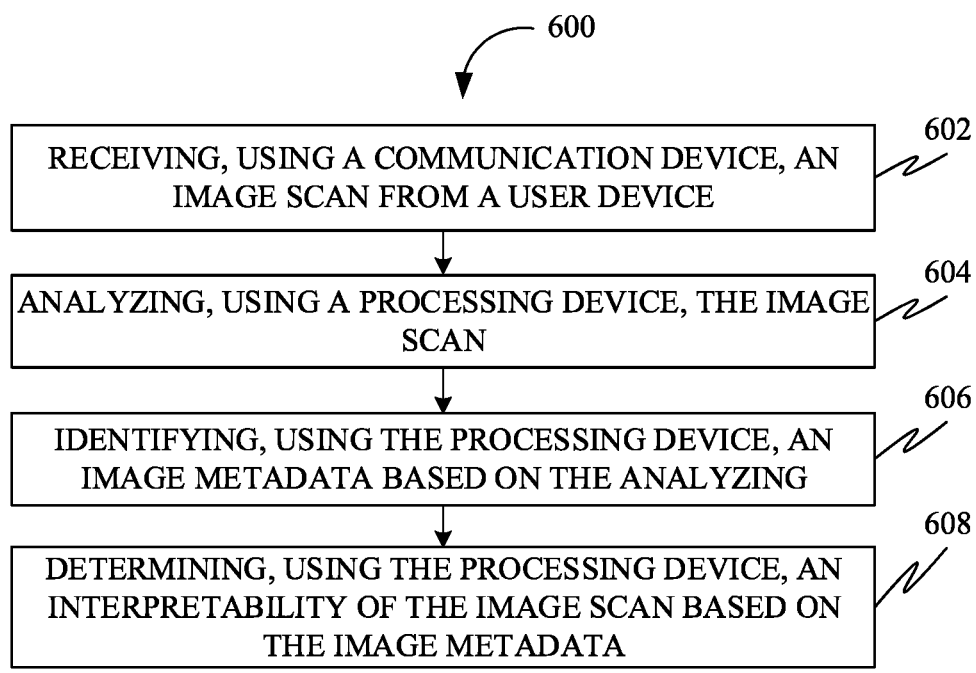
FIG. 6 shows a flowchart of a method to facilitate determining an interpretability of an image scan using an image metadata, in accordance with some embodiments.

FIG. 6 illustrates a flowchart of a method 600 to facilitate determining an interpretability of an image scan using an image metadata, in accordance with some embodiments. Accordingly, at 602, the method 600 may include a step of receiving, using a communication device, an image scan from a user device. Further, the image scan, in an instance, may be an image in a digital form that may be given to the online platform for translating through an optical character recognition (OCR). Further, the image scan, in an instance, may consist of textual and/or non-textual content. Further, the image scan, in an instance, may include images of, but not limited to, a visiting card, a score card, a memorandum, a note, a handwritten note, a newspaper, a magazine, a report, and/or any arbitrary image that may or may not contain textual content. Further, the image scan, in an instance, may be captured from the user device. The user device, in an instance, may be an image capturing device configured to capture images by using one or more camera sensors. Further, the one or more camera sensors, in an instance, may be included in, but not limited to, a smartphone, a laptop, a DSLR, a smartwatch etc.

Further, at 604, the method 600 may include a step of analyzing, using a processing device, the image scan.

Accordingly, the analyzing of the image scan, in an instance, may be performed by the online platform 100 based on machine learning and/or AI technology. Further, the image scan, in an instance, may be analyzed by the online platform 100 with statistical techniques to enable the online platform to learn, without being explicitly programmed. Further, the online platform 100, in an instance, may learn a placement of words, phrases, and/or names etc. from the image scan received from the user device. For instance, an image scan of a visiting card from a company may have a predefined format (such as a name of a person may be on top right of the visiting card with contact details on bottom left etc.) that may be analyzed and/or learnt by the online platform 100 based on machine learning and/or AI technology.

Further, at 606, the method 600 may include a step of identifying, using the processing device, an image metadata based on the analyzing. Accordingly, the image metadata, in an instance, may be any data associated with an image that may provide insights with regard to a characteristic associated with the image. The characteristics associated with the image, in an instance, may include, but not limited to, size, dimension, color, tone, contour, type, resolution, and/or pixel density etc. associated with the image scan. For instance, an image of a visiting card may have an image metadata representing a dimension of the image as 3.5×2 inches. Further, the characteristics associated with the image, in an instance, may be unique for the image captured from the user device. Further, the image metadata, in some embodiments, may include a characteristic of the user device that may be used to capture the image. The characteristic of the user device, in an instance, may include, but not limited to, a field of view, a focal length, a pitch, a width, a curvature, and/or an aperture etc. associated with the user device. For instance, the image metadata for an image captured from a user device (such as a smartphone) may include a field of view of 60 degrees with an aperture of 2 mm. Further, an image scan with the same content (textual and/or non-textual), in an instance, may have different image metadata depending upon the user device used for capturing the image. For instance, an image captured by the user device such as a DSLR may have different image metadata (such as resolution) for the same image when captured from a different user device such as a smartphone. Further, the image scan, in an instance, may have different image metadata when captured from the same user device but with a different surrounding environment and/or time. For instance, an image of a visiting card captured from a user device (such as a smartphone) may have different image metadata (such as distortion) associated with the image when captured at a different surrounding environment and/or time (such as at day time and/or at night time).

Further, at 608, the method 600 may include a step of determining, using the processing device, an interpretability of the image scan based on the image metadata. Accordingly, the interpretability of the image scan, in an instance, may be defined as a measure for the image to be interpreted and/or understood by the online platform before translating the image scan through an optical character recognition (OCR). The interpretability of the image scan, in an instance, may depend upon the image metadata of the image scan. For instance, an image scan may have relatively higher interpretability for the image scan with an image metadata that may include a higher resolution value than an image scan with an image metadata that may include a lower resolution value.

Figure 7:
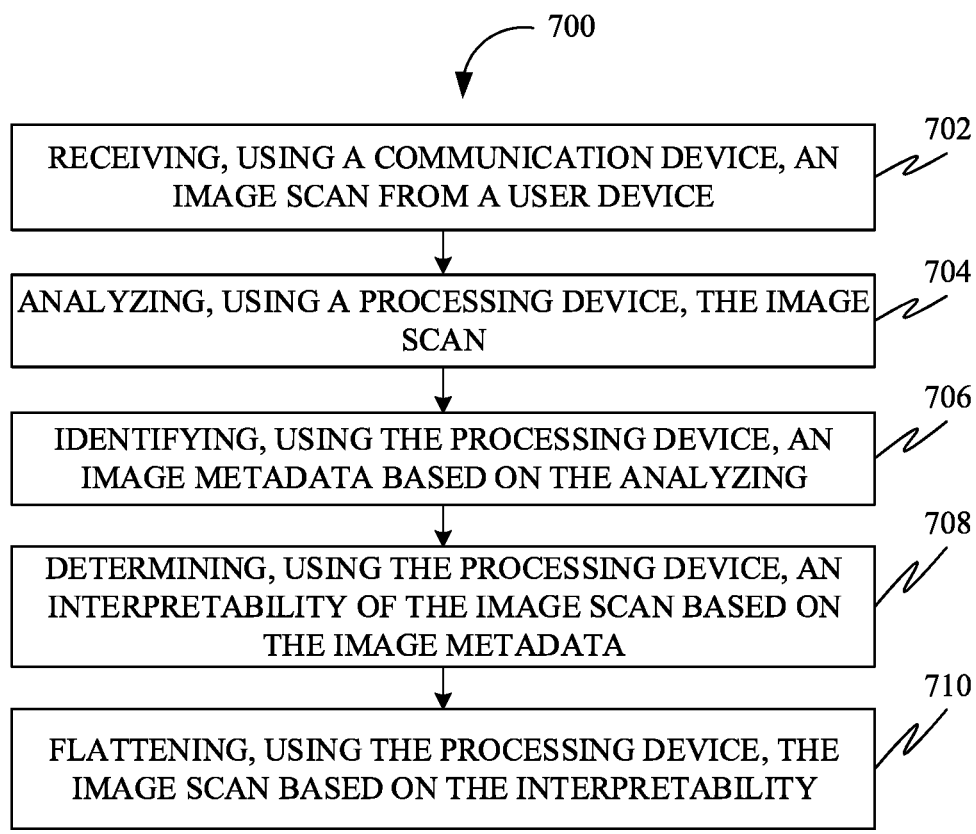
FIG. 7 shows a flowchart of a method to facilitate flattening of an image scan based on an interpretability of the image scan before translating through an OCR, in accordance with some embodiments.

FIG. 7 illustrates a flowchart of a method 700 to facilitate flattening of an image scan based on an interpretability of the image scan before translating through an OCR, in accordance with some embodiments. Accordingly, at 702, the method 700 may include a step of receiving, using a communication device, an image scan from a user device. Further, the image scan, in an instance, may be an image in a digital form that may be given to the online platform for translating through an optical character recognition (OCR). Further, the image scan, in an instance, may consist of textual and/or non-textual content. Further, the image scan, in an instance, may include images of, but not limited to, a visiting card, a score card, a memorandum, a note, a handwritten note, a newspaper, a magazine, a report, and/or any arbitrary image that may or may not contain textual content. Further, the image scan, in an instance, may be captured from the user device. The user device, in an instance, may be an image capturing device configured to capture images by using one or more camera sensors. Further, the one or more camera sensors, in an instance, may be included in, but not limited to, a smartphone, a laptop, a DSLR, a smartwatch etc.

Further, at 704, the method 700 may include a step of analyzing, using a processing device, the image scan. Accordingly, the analyzing of the image scan, in an instance, may be performed by the online platform 100 based on machine learning and/or AI technology. Further, the image scan, in an instance, may be analyzed by the online platform 100 with statistical techniques to enable the online platform to learn, without being explicitly programmed. Further, the online platform 100, in an instance, may learn a placement of words, phrases, and/or names etc. from the image scan received from the user device. For instance, an image scan of a visiting card from a company may have a predefined format (such as a name of a person may be on top right of the visiting card with contact details on bottom left etc.) that may be analyzed and/or learnt by the online platform 100 based on machine learning and/or AI technology.

Further, at 706, the method 700 may include a step of identifying, using the processing device, an image metadata based on the analyzing. Accordingly, the image metadata, in an instance, may be any data associated with an image that may provide insights with regard to a characteristic associated with the image. The characteristics associated with the image, in an instance, may include, but not limited to, size, dimension, color, tone, contour, type, resolution, and/or pixel density etc. associated with the image scan. For instance, an image of a visiting card may have an image metadata representing a dimension of the image as 3.5×2 inches. Further, the characteristics associated with the image, in an instance, may be unique for the image captured from the user device. Further, the image metadata, in some embodiments, may include a characteristic of the user device that may be used to capture the image. The characteristic of the user device, in an instance, may include, but not limited to, a field of view, a focal length, a pitch, a width, a curvature, and/or an aperture etc. associated with the user device. For instance, the image metadata for an image captured from a user device (such as a smartphone) may include a field of view of 60 degrees with an aperture of 2 mm. Further, an image scan with the same content (textual and/or non-textual), in an instance, may have different image metadata depending upon the user device used for capturing the image. For instance, an image captured by the user device such as a DSLR may have different image metadata (such as resolution) for the same image when captured from a different user device such as a smartphone. Further, the image scan, in an instance, may have different image metadata when captured from the same user device but with a different surrounding environment and/or time. For instance, an image of a visiting card captured from a user device (such as a smartphone) may have different image metadata (such as distortion) associated with the image when captured at a different surrounding environment and/or time (such as at day time and/or at night time).

Further, at 708, the method 700 may include a step of determining, using the processing device, an interpretability of the image scan based on the image metadata. Accordingly, the interpretability of the image scan, in an instance, may be defined as a measure for the image to be interpreted and/or understood by the online platform before translating the image scan through an optical character recognition (OCR). The interpretability of the image scan, in an instance, may depend upon the image metadata of the image scan. For instance, an image scan may have relatively higher interpretability for the image scan with an image metadata that may include a higher resolution value than an image scan with an image metadata that may include a lower resolution value.

Further, at 710, the method 700 may include a step of flattening, using the processing device, the image scan based on the interpretability. Accordingly, the image scan captured from the user device, in an instance, may suffer a distortion due to perspective, uneven surface and/or unconstrained external environment etc. For instance, an image scan of a visiting card that may be captured by a user device (such as a smartphone) may include distortion due to a curved page and/or an uneven surface on which the visiting card may be placed. The distortion in the image scan, in an instance, may be removed by the online platform by flattening the image scan before translating the image scan through the OCR. The flattening of the image scan, in an instance, may include a step of determining a contour of the image scan. The contour of the image scan, in an instance, may be determined by the online platform by transforming the image scan from a three dimensional to a two dimensional form by using mathematical tools. For instance, transforming the image scan with [x, y, z] coordinates to an [x, y] coordinates. Further, the flattening of the image scan, in an instance, may include a transformation of the image into grayscale for better detection of text through the OCR.

Figure 8:
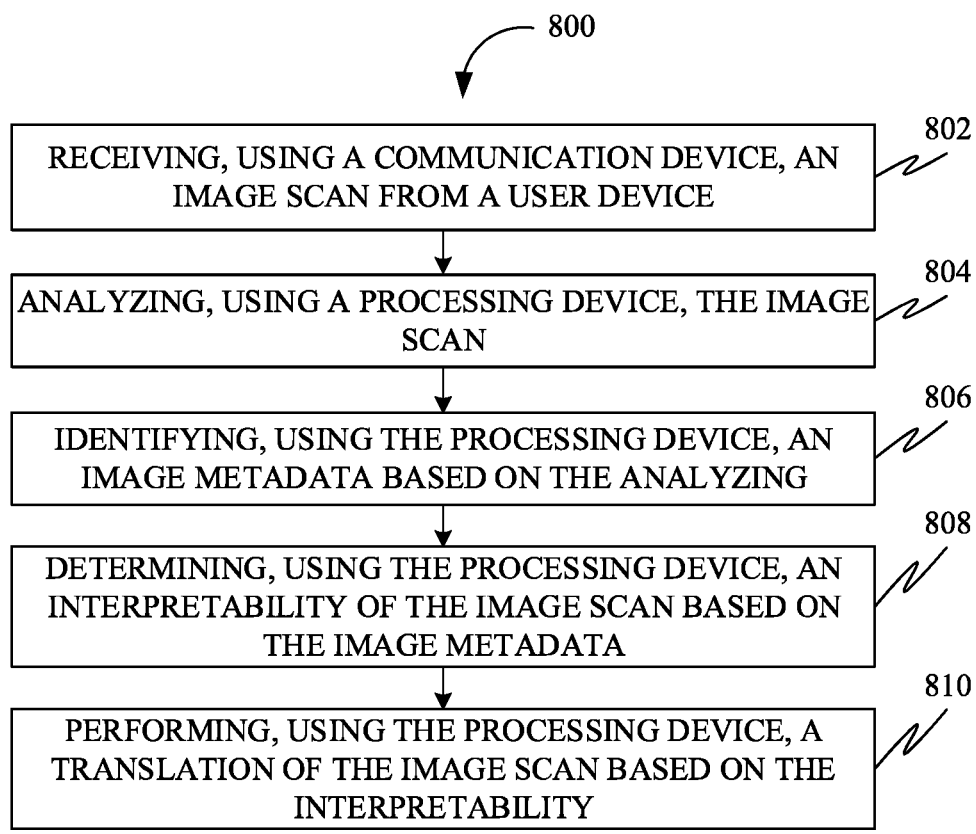
FIG. 8 shows a flowchart of a method to facilitate determining contextual and semantic meaning from an image scan, in accordance with some embodiments.

FIG. 8 illustrates a flowchart of a method 800 to facilitate determining contextual and semantic meaning from an image scan, in accordance with some embodiments. Accordingly, at 802, the method 800 may include a step of receiving, using a communication device, an image scan from a user device. Further, the image scan, in an instance, may be an image in a digital form that may be given to the online platform 100 for translating through an optical character recognition (OCR). Further, the image scan, in an instance, may consist of textual and/or non-textual content. Further, the image scan, in an instance, may include images of, but not limited to, a visiting card, a score card, a memorandum, a note, a handwritten note, a newspaper, a magazine, a report, and/or any arbitrary image that may or may not contain textual content. Further, the image scan, in an instance, may be captured from the user device. The user device, in an instance, may be an image capturing device configured to capture images by using one or more camera sensors. Further, the one or more camera sensors, in an instance, may be included in, but not limited to, a smartphone, a laptop, a DSLR, a smartwatch etc.

Further, at 804, the method 800 may include a step of analyzing, using a processing device, the image scan. Accordingly, the analysis of the image scan, in an instance, may be performed by the online platform 100 based on machine learning and/or AI technology. Further, the image scan, in an instance, may be analyzed by the online platform 100 with statistical techniques to enable the online platform 100 to learn, without being explicitly programmed. Further, the online platform 100, in an instance, may learn a placement of words, phrases, and/or names etc. from the image scan received from the user device. For instance, an image scan of a visiting card from a company may have a predefined format (such as a name of a person may be on top right of the visiting card with contact details on bottom left etc.) that may be analyzed and/or learnt by the online platform 100 based on machine learning and/or AI technology.

Further, at 806, the method 800 may include a step of identifying, using the processing device, an image metadata based on the analyzing. Accordingly, the image metadata, in an instance, may be any data associated with an image that may provide insights with regard to a characteristic associated with the image. The characteristics associated with the image, in an instance, may include, but not limited to, size, dimension, color, tone, contour, type, resolution, and/or pixel density etc. associated with the image scan. For instance, an image of a visiting card may have an image metadata representing a dimension of the image as 3.5×2 inches. Further, the characteristics associated with the image, in an instance, may be unique for the image captured from the user device. Further, the image metadata, in some embodiments, may include a characteristic of the user device that may be used to capture the image. The characteristic of the user device, in an instance, may include, but not limited to, a field of view, a focal length, a pitch, a width, a curvature, and/or an aperture etc. associated with the user device. For instance, the image metadata for an image captured from a user device (such as a smartphone) may include a field of view of 60 degrees with an aperture of 2 mm. Further, an image scan with the same content (textual and/or non-textual), in an instance, may have different image metadata depending upon the user device used for capturing the image. For instance, an image captured by the user device such as a DSLR may have different image metadata (such as resolution) for the same image when captured from a different user device such as a smartphone. Further, the image scan, in an instance, may have different image metadata when captured from the same user device but with a different surrounding environment and/or time. For instance, an image of a visiting card captured from a user device (such as a smartphone) may have different image metadata (such as distortion) associated with the image when captured at a different surrounding environment and/or time (such as at day time and/or at night time).

Further, at 808, the method 800 may include a step of determining, using the processing device, an interpretability of the image scan based on the image metadata. Accordingly, the interpretability of the image scan, in an instance, may be defined as a measure for the image to be interpreted and/or understood by the online platform 100 before translating the image scan through an optical character recognition (OCR). The interpretability of the image scan, in an instance, may depend upon the image metadata of the image scan. For instance, an image scan may have relatively higher interpretability for the image scan with an image metadata that may include a higher resolution value than an image scan with an image metadata that may include a lower resolution value.

Further, at 810, the method 800 may include a step of performing, using the processing device, a translation of the image scan based on the interpretability. Accordingly, the translation of the image scan, in an instance, may signify a conversion of the image scan into a readable text in such a way that semantic and contextual meaning of an image may be maintained. Further, the translation of the image scan, in some embodiments, may be performed by the online platform 100 based on the optical character recognition (OCR) that may be bolstered by a language specific dictionary of words, phrases, and/or names associated with the image scan. Further, the language specific dictionary, in an instance, may include a plurality of nodes. Each node of the plurality of nodes, in an instance, may represent a word, phrases, and/or names that may be interconnected with each other in a web form (and/or nested structure). Each node, in an instance, may have one or more parent nodes and/or one or more child nodes. For instance, a word 'dog' may have two parent nodes such as 'pet' (as in dog as a pet) and 'house' (as in dog house). Further, in the aforementioned example, the word 'house', in an instance, may have one child node as 'dog'. Further, each node of the plurality of nodes, in an instance, may include a percentage that may signify a frequency of the use of the node relative to other nodes. For instance, the node 'dog' may appear more frequently under the parent node 'pet' than the parent node 'house'. The node with a relatively higher percentage, in some embodiments, may be used by the OCR for translating the image scan. Further, in some embodiments, the online platform 100 may find a common link between one or more nodes for translating the image scan through the OCR. For instance, an image scan translated as 'My dog needs a roof' may have actual meaning as 'My dog house needs a roof'. In the aforementioned case, the word 'house' may be added by the online system for maintaining the contextual and semantic meaning of the image scan. The online platform 100, in an instance, may follow subsequent steps in order to find the common link between one or more nodes. The online platform 100, in an instance, may isolate important words (such as 'dog' and 'roof' in the aforementioned example) and trivial words (such as 'a', 'the' etc.) from a text. Further, the online platform 100, in an instance, may determine a common link between the important words (such as in the aforementioned example, the word 'dog' may have two parent node, 'house' and 'pet'. Further, the word 'roof' may very well have only one use, that is as an enclosure to the top of a building. Therefore, a context of the word 'roof' becomes building. Further, the word 'roof' may have a parent node as 'house' in the context of building).

Figure 9:
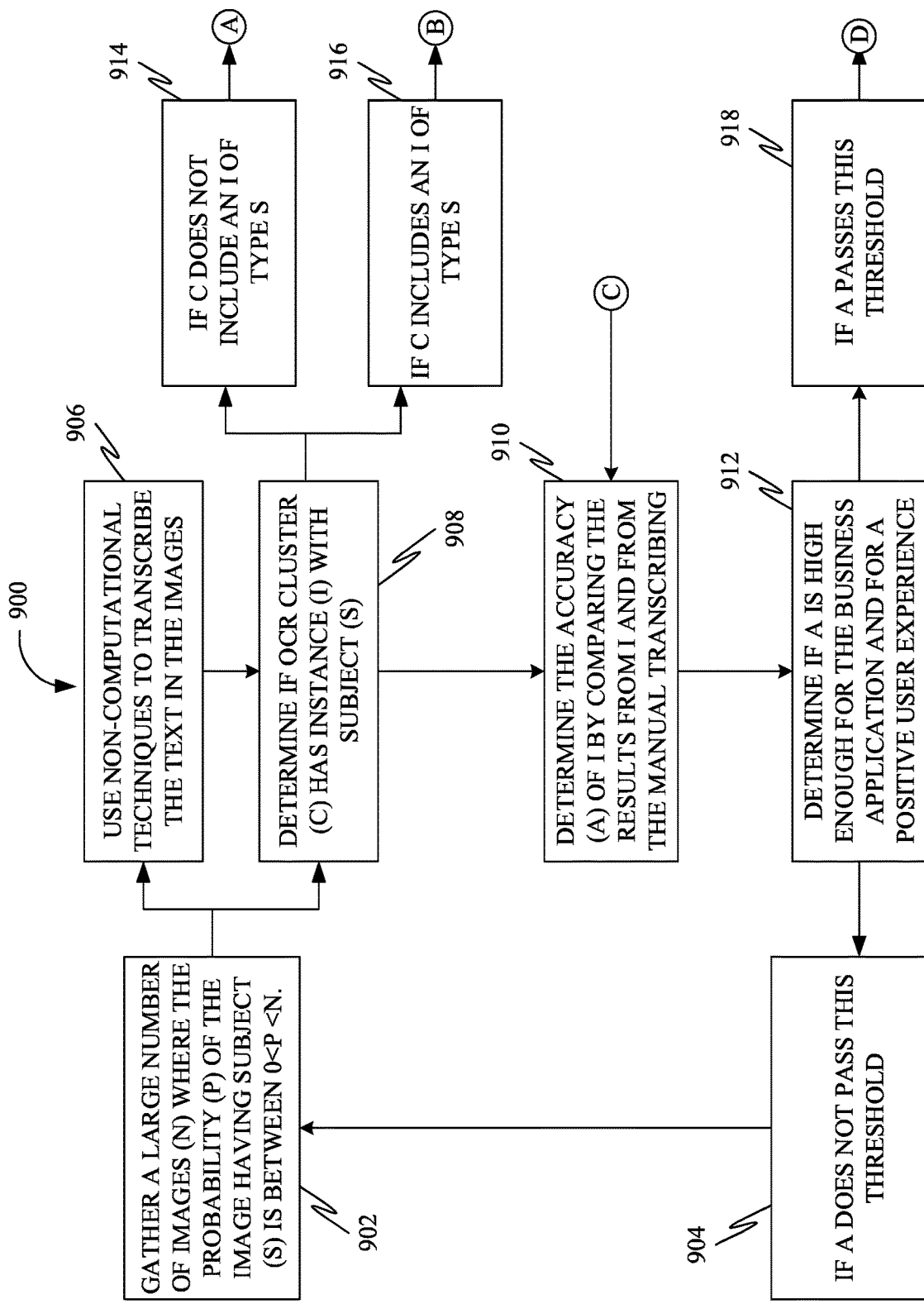
FIG. 9 illustrates a flowchart of a method to facilitate determining contextual and semantic meaning of an image by adding more subsets of images in order to increase an accuracy of the system, in accordance with some embodiments.
Figure 10:
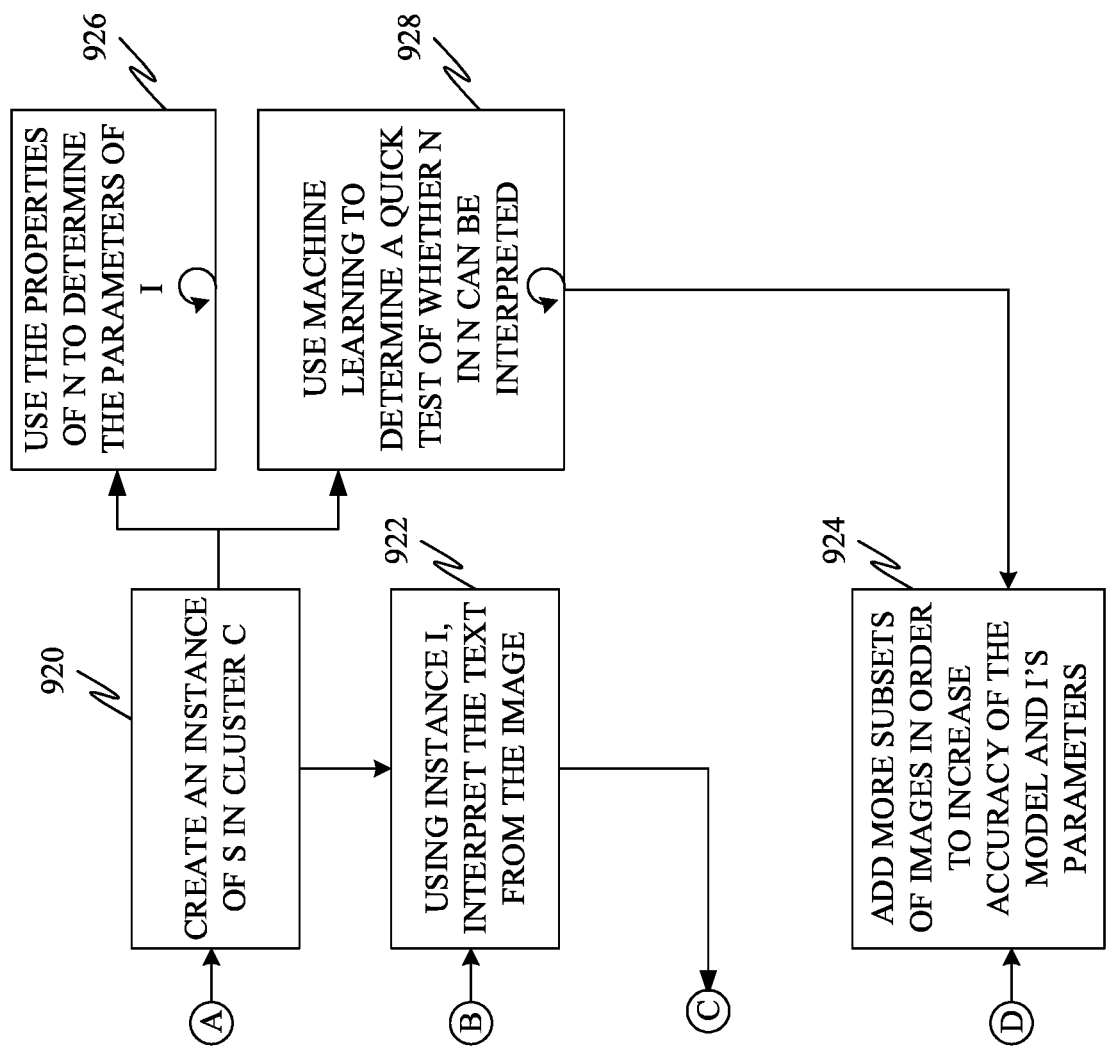
FIG. 10 is a continuation flowchart of FIG. 9.

FIG. 9 illustrates a flowchart of a method 900 to facilitate determining contextual and semantic meaning of an image by adding more subsets of images in order to increase an accuracy of the system, in accordance with some embodiments. FIG. 10 is a continuation flowchart of FIG. 9.

At 902, the method 900 may include gathering a large number of images (N) where the probability (P) of the image having subject (S) is between 0<P<N.

Further, at 906, the method 900 may include using non-computational techniques to transcribe the text in the images.

Further, at 908, the method 900 may include determining if OCR cluster (C) has instance (I) with subject (S).

Further, at 910, the method 900 may include determining the accuracy (A) of I by comparing the results from I and from the manual transcribing.

Further, at 912, the method 900 may include determining if A is high enough for the business application and for a positive user experience.

Further, at 904, the method 900 may include going to step 902 if A does not pass this threshold.

Further, at 918, the method 900 may include going to step 924 if A passes this threshold.

After 908, at 914, the method 900 may include going to step 920, if C does not include an I of type S. Further, at 920, the method 900 may include creating an instance of S in cluster C.

After 908, at 916, the method 900 may include going to step 922, if C includes an I of type S. Further, at 922, the method 900 may include using instance I, interpret the text from the image.

Further, at 926, the method 900 may include using the properties of N to determine the parameters of I.

Further, at 928, the method 900 may include using machine learning to determine a quick test of whether n in N can be interpreted. Further, the machine learning may include support vector machine.

Further, at 924, the method 900 may include adding more subsets of images in order to increase accuracy of the model and I's parameters.

Figure 11:
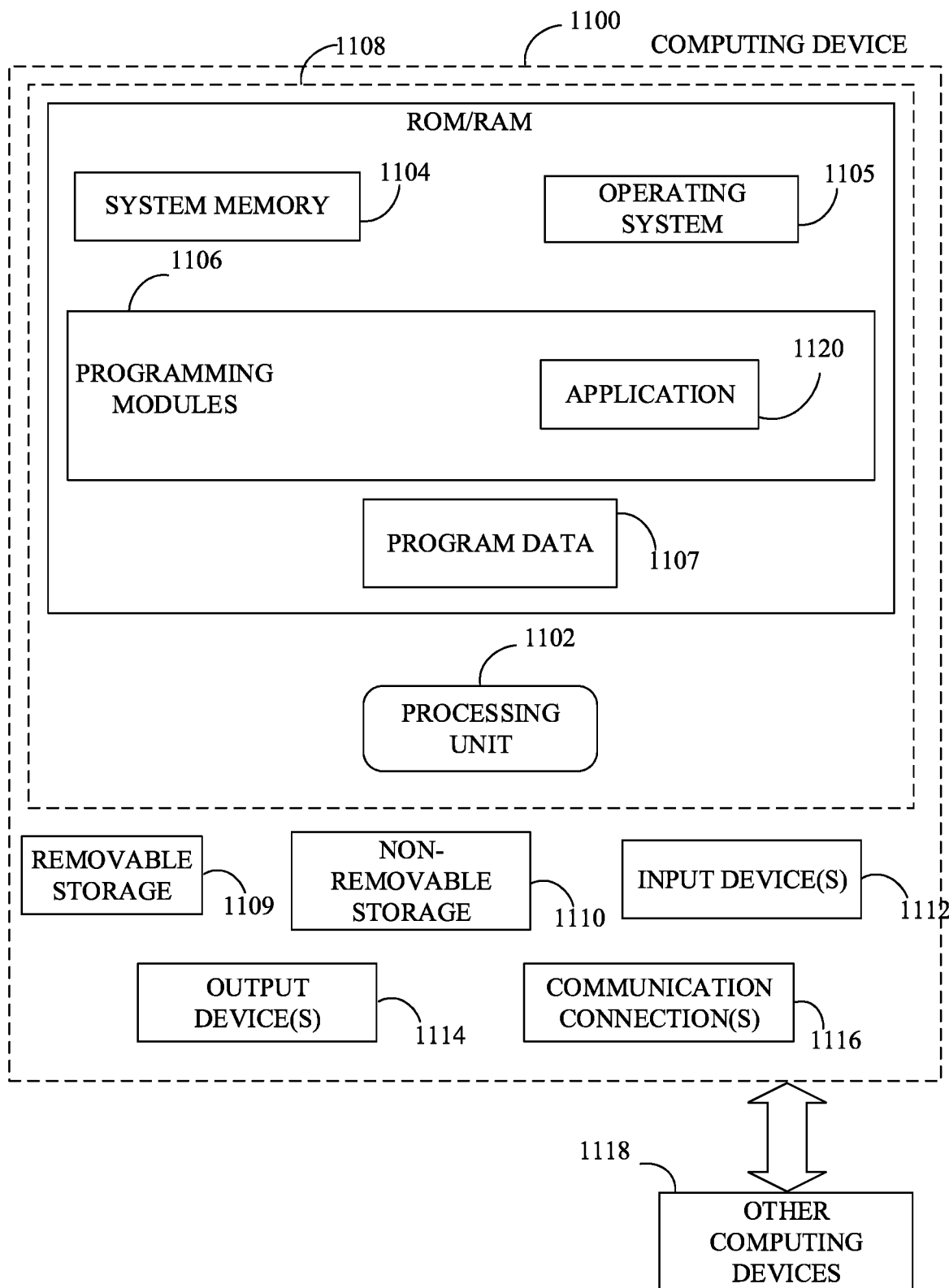
FIG. 11 is a block diagram of a computing device for implementing the methods disclosed herein, in accordance with some embodiments.

With reference to FIG. 11, a system consistent with an embodiment of the disclosure may include a computing device or cloud service, such as a computing device 1100. In a basic configuration, computing device 1100 may include at least one processing unit 1102 and a system memory 1104. Depending on the configuration and type of computing device, system memory 1104 may comprise, but is not limited to, volatile (e.g. random-access memory (RAM)), non-volatile (e.g. read-only memory (ROM)), flash memory, or any combination. System memory 1104 may include operating system 1105, one or more programming modules 1106, and may include a program data 1107. Operating system 1105, for example, may be suitable for controlling computing device 1100's operation. In one embodiment, programming modules 1106 may include image-processing module, machine learning module. Furthermore, embodiments of the disclosure may be practiced in conjunction with a graphics library, other operating systems, or any other application program and is not limited to any particular application or system. This basic configuration is illustrated in FIG. 11 by those components within a dashed line 1108.

Computing device 1100 may have additional features or functionality. For example, computing device 1100 may also include additional data storage devices (removable and/or non-removable) such as, for example, magnetic disks, optical disks, or tape. Such additional storage is illustrated in FIG. 11 by a removable storage 1109 and a non-removable storage 1110. Computer storage media may include volatile and non-volatile, removable and non-removable media implemented in any method or technology for storage of information, such as computer-readable instructions, data structures, program modules, or other data. System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, a location sensor, a camera, a biometric sensor, etc. Output device(s) 1114 such as a display, speakers, a printer, etc. may also be included. The aforementioned devices are examples and others may be used.

Computing device 1100 may also contain a communication connection 1116 that may allow device 1100 to communicate with other computing devices 1118, such as over a network in a distributed computing environment, for example, an intranet or the Internet. Communication connection 1116 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 1104, including operating system 1105. While executing on processing unit 1102, programming modules 1106 (e.g., application 1120 such as a media player) may perform processes including, for example, one or more stages of methods, algorithms, systems, applications, servers, databases as described above. The aforementioned process is an example, and processing unit 1102 may perform other processes.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may, in fact, be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

The following is claimed:

1. A system for facilitating determining contextual and semantic meaning from an image scan, the system comprising:

a communication device configured for:

receiving a plurality of images from at least one source device;

receiving an image scan from at least one user device; and transmitting an interpretability notification to the at least one user device; and a processing device configured for:
- analyzing the plurality of images;
- identifying an image metadata based on the analyzing;
- analyzing the image scan;
- identifying an image scan metadata based on the analyzing of the image scan;
- comparing the image scan metadata and the image metadata;
- determining an interpretability of the image scan based on the comparing; and
- generating the interpretability notification based on the determining.

2. The system of claim 1 further comprising a storage device communicatively coupled with the processing device, wherein the storage device is configured for storing the plurality of images and the image metadata in a database.

3. The system of claim 1, wherein the plurality of images comprises at least one of a textual content and a non-textual content.

4. The system of claim 1, wherein the image scan comprises at least one of a textual content and a non-textual content.

5. The system of claim 1, wherein the at least one user device comprises at least one image sensor, wherein the at least one image sensor is configured for generating the image scan.

6. The system of claim 1, wherein the analyzing of the plurality of images is based on at least one machine learning model, wherein the at least one machine learning model is configured for determining the image metadata.

7. The system of claim 1, wherein the analyzing of the image scan is based on at least one machine learning model, wherein the at least one machine learning model is configured for determining the image scan metadata.

8. The system of claim 1, wherein the processing device is configured for flattening the image scan based on the interpretability.

9. The system of claim 8, wherein the flattening comprises transforming of the image scan from a three-dimensional image scan to a two dimensional image scan for determining a contour of the image scan.

10. The system of claim 8, wherein the flattening comprises transforming of the image scan into a grayscale image scan.

11. The system of claim 1, wherein the processing device is configured for performing translation of the image scan based on the interpretability.

12. The system of claim 11, wherein the communication device is further configured for transmitting the translation to the at least one user device.

13. The system of claim 11, wherein the performing of the translation uses an optical character recognition, wherein the optical character recognition comprises a language specific dictionary for recognition of at least one of words, phrases, and names associated with the image scan.

14. The system of claim 13, wherein the language specific dictionary comprises a plurality of nodes, wherein each node of the plurality of nodes represents at least one of a word, a phrase, and a name and a percentage signifying usage of at least one of the word, the phrase, and the name in the image scan, wherein a node of the plurality of nodes facilitates the translation of the image scan.

15. A method for facilitating determining contextual and semantic meaning from an image scan, the method comprising:

receiving, using a communication device, a plurality of images from at least one source device;

analyzing, using a processing device, the plurality of images;

identifying, using the processing device, an image metadata based on the analyzing;

receiving, using the communication device, an image scan from at least one user device;

analyzing, using the processing device, the image scan;

identifying, using the processing device, an image scan metadata based on the analyzing of the image scan;

comparing, using the processing device, the image scan metadata and the image metadata;

determining, using the processing device, an interpretability of the image scan based on the comparing;

generating, using the processing device, an interpretability notification based on the determining; and transmitting, using the communication device, the interpretability notification to the at least one user device.

16. The method of claim 15, wherein the plurality of images comprises at least one of a textual content and a non-textual content.

17. The method of claim 15, wherein the image scan comprises at least one of a textual content and a non-textual content.

18. The method of claim 15, wherein the at least one user device comprises at least one image sensor, wherein the at least one image sensor is configured for generating the image scan.

19. The method of claim 15, wherein the analyzing of the plurality of images is based on at least one machine learning model, wherein the at least one machine learning model is configured for determining the image metadata.

20. The method of claim 15, wherein the analyzing of the image scan is based on at least one machine learning model, wherein the at least one machine learning model is configured for determining the image scan metadata.

* * * * *